US008922714B2

United States Patent
Bhaskaran et al.

(10) Patent No.: US 8,922,714 B2
(45) Date of Patent: *Dec. 30, 2014

(54) SYSTEM AND METHODS FOR ADJUSTING SETTINGS OF A VIDEO POST-PROCESSOR (71) Applicant: Marvell World Trade Ltd., St. Michael (BB)

(72) Inventors: Vasudev Bhaskaran, Sunnyvale, CA (US); Mainak Biswas, Santa Cruz, CA (US); Nikhil Balram, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/062,372

(22) Filed: Oct. 24, 2013

(65) Prior Publication Data

US 2014/0049694 A1 Feb. 20, 2014

Related U.S. Application Data (63) Continuation of application No. 12/764,214, filed on Apr. 21, 2010, now Pat. No. 8,570,438.

(60) Provisional application No. 61/171,234, filed on Apr. 21, 2009.

(51) Int. Cl.
| | |
|---|---|
| H04N 5/46 | (2006.01) |
| H04N 19/85 | (2014.01) |
| H04N 21/4425 | (2011.01) |
| H04N 21/442 | (2011.01) |
| H04N 19/86 | (2014.01) |
| H04N 19/154 | (2014.01) |
| H04N 19/80 | (2014.01) |
| H04N 21/426 | (2011.01) |
| H04N 21/438 | (2011.01) |
| H04N 19/59 | (2014.01) |
| H04N 19/117 | (2014.01) |
| H04N 19/61 | (2014.01) |
| H04N 21/61 | (2011.01) |
| G06T 7/00 | (2006.01) |
| H04L 29/06 | (2006.01) |
| H04N 5/44 | (2011.01) |

(52) U.S. Cl.
CPC ..... *H04N 19/00903* (2013.01); *H04N 21/4425* (2013.01); *H04N 21/44209* (2013.01); *H04N 19/00909* (2013.01); *H04N 19/002* (2013.01); *H04L 65/80* (2013.01); *H04N 19/0089* (2013.01); *H04N 21/426* (2013.01); *H04N 5/4401* (2013.01); *H04N 21/4382* (2013.01); *H04N 19/00757* (2013.01); *H04N 19/00066* (2013.01); *H04N 19/00781* (2013.01); *H04N 21/6125* (2013.01); *G06T 7/0002* (2013.01); *G06T 2207/10016* (2013.01); *G06T 2207/20004* (2013.01)
USPC ........... 348/555; 348/554; 348/625; 348/627; 348/607

(58) Field of Classification Search
USPC ......... 348/180, 181, 191, 192, 554–558, 581, 348/582, 441–458, 607–627; 702/81, 84; 725/135
See application file for complete search history.

(56) References Cited

U.S. PATENT DOCUMENTS

| | | | |
|---|---|---|---|
| 7,199,819 | B2 | 4/2007 | Sugimoto et al. |
| 7,724,310 | B2 | 5/2010 | Higashi |

(Continued)

FOREIGN PATENT DOCUMENTS

| | | |
|---|---|---|
| WO | WO 03/005729 | 1/2003 |
| WO | WO 03/077562 | 9/2003 |
| WO | WO 2008/007304 | 1/2008 |

OTHER PUBLICATIONS

International Search Report for Application No. PCT/US2010/031911 (corresponding hereto) mailed Feb. 7, 2010; 4 pages.

*Primary Examiner* — Michael Lee (57) ABSTRACT

A video processing system includes a network processing module configured to receive video content. A decoder module is configured to decode the video content received from the content transmitting system, and separately provide each of the decoded video content and data describing transmission features of the video content. A video quality estimation module is configured to estimate a quality factor based on the data describing the transmission features of the video content, wherein the quality factor corresponds to an estimation of a visual quality of the video content. A database control module configured to select, based on the quality factor, one of a plurality of predetermined settings for video post-processing. A video post-processing module is configured to receive the decoded video content separately provided from the decoder module, and process the decoded video content based on the selected one of the predetermined settings.

20 Claims, 7 Drawing Sheets

(56) References Cited

U.S. PATENT DOCUMENTS

| | | |
|---|---|---|
| 7,821,534 B2 | 10/2010 | Somers |
| 8,154,602 B2 | 4/2012 | Yamagishi et al. |
| 2002/0067369 A1 | 6/2002 | Sullivan |
| 2003/0001964 A1 | 1/2003 | Masukura et al. |
| 2004/0012675 A1 | 1/2004 | Caviedes |
| 2004/0170330 A1 | 9/2004 | Fogg |
| 2007/0234385 A1 | 10/2007 | Bopardikar |
| 2008/0143877 A1 | 6/2008 | Urabe et al. |

SYSTEM AND METHODS FOR ADJUSTING SETTINGS OF A VIDEO POST-PROCESSOR

CROSS-REFERENCE TO RELATED APPLICATIONS

This application is a continuation of U.S. application Ser. No. 12/764,214 (now U.S. Pat. No. 8,570,438), filed Apr. 21, 2010, which claims the benefit of U.S. Provisional Application No. 61/171,234, filed on Apr. 21, 2009. The disclosure of the above application is incorporated herein by reference in its entirety.

FIELD

The present disclosure relates to Internet video content and more particularly to quality of Internet video content.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Digital video content that is available on DVDs and in a broadcast environment is restricted to relatively few video resolutions. These video resolutions are typically "standard definition" or "high definition".

In contrast, video content that is streamed over the Internet spans a wide range of resolutions from low definition Quarter Video Graphics Array (QVGA) (e.g., 320×240 pixel resolution) to high definition (e.g., 720 lines of progressive video (720p)). Further, Internet video content is compressed using one of a variety of standard codecs or proprietary codecs and covers a wide range of bitrates, e.g., from 200 kbps to greater than 5 Mbps.

Wide variations in resolutions, codec artifacts and bitrates lead to a wide range of video quality for the streamed video content. Further, network bandwidth is often limited. Therefore, video content is often scaled to the available bandwidth. This scaling may affect video quality. Most streaming video content is therefore of much lower quality than typical broadcast TV services.

Many receivers, e.g., an Internet Protocol TV (IPTV) set top box, include a video post-processing function to improve quality of video content.

SUMMARY

A system comprising a quality estimation module configured to estimate a visual quality of video content based on data from a decoder module. The system further comprising a settings database configured to store a plurality of predetermined settings. The settings database outputs at least one of the predetermined settings in response to the visual quality. The system further comprising a video post-processor module configured to automatically adjust settings of the video post-processor module based on the at least one of the predetermined settings. The video content is processed based on the settings of the video post-processor module that were automatically adjusted.

In other features, the quality estimation module determines a quality factor to represent the visual quality of the video content. The data includes metadata information that indicates transmission features for the video content. The system further comprising a database control module to select the at least one of the predetermined settings based on the quality factor. The database control module comprises an estimation module to adjust selection of the at least one of the predetermined settings based on video outputs of the video post-processor module.

In other features, the system further comprises an estimation module to estimate residual artifacts in output signals from the post-processor module. The output signals include the video content after sub-module settings for sub-modules of the video post-processor module have been adjusted a first time. The selection module re-selects from at least one of the predetermined settings based on estimates of the residual artifacts to adjust the sub-module settings a second time.

In still other features, the systems and methods described above are implemented by a computer program executed by one or more processors, by computer hardware, or a combination of HW and SW. The computer program can reside on a computer readable medium such as but not limited to memory, nonvolatile data storage, and/or other suitable tangible, non-transitory storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
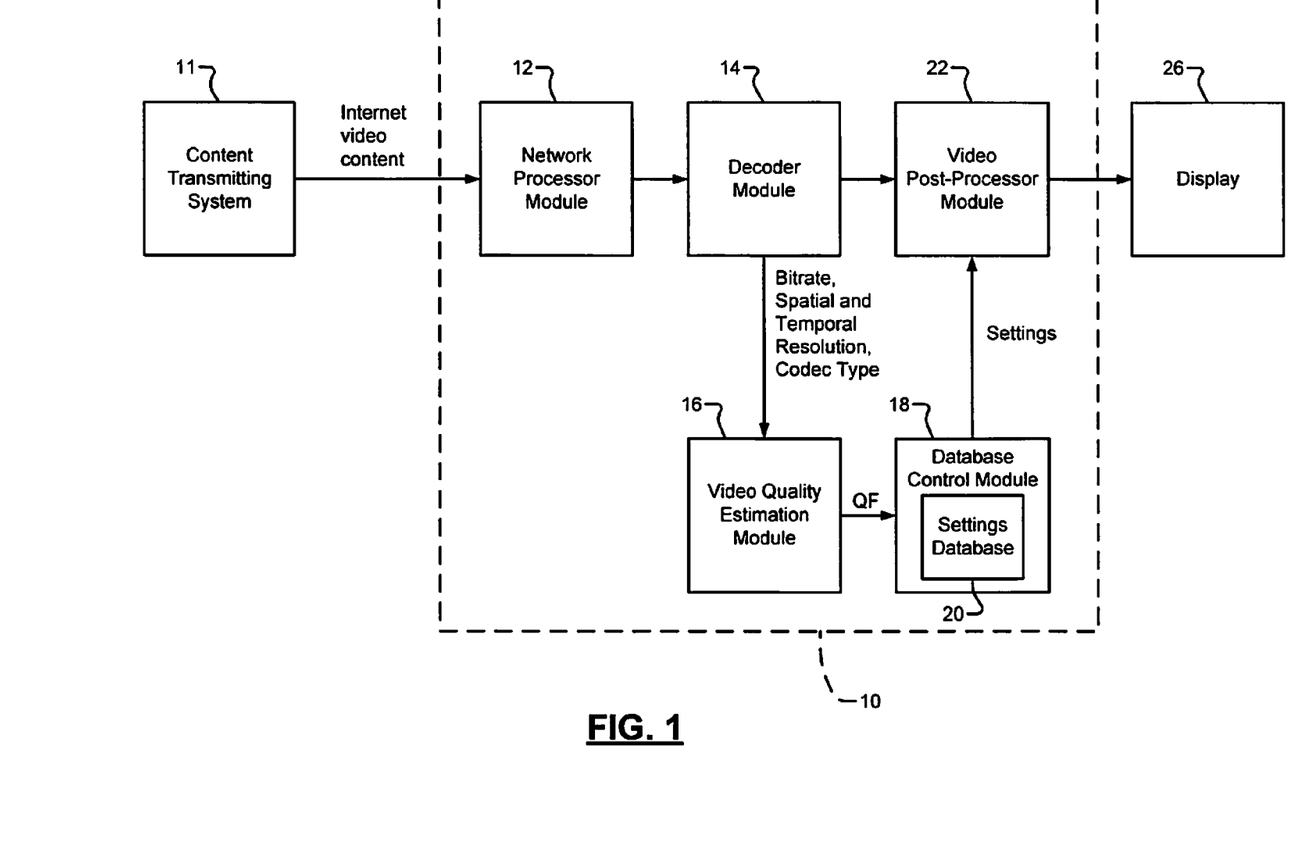
FIG. 1 is a block diagram that illustrates a video processing system according to a first embodiment of the present disclosure.

Referring now to FIG. 1, a video processing system 10 is illustrated. A content transmitting system 11 that is external to the system 10 provides input, such as Internet video signals including Internet video content, to a network processor module 12 of the system 10. In one embodiment, the content transmitting system 11 is an Internet Protocol television (IPTV) transmitter, an Internet television (ITV) transmitter, and/or a streaming TV transmitter.

A decoder module 14 receives and decodes the video signals from the network processor module 12. An example of the decoder module 14 is a multi-format video decoder that decodes data from different types of encoders.

A video quality estimation module 16 receives data from the decoder module 14. An example of the data is coded stream metadata that describes how the content was transmitted, i.e., transmission features for the data. Examples of the metadata are bitrate, spatial resolution, temporal resolution and codec type. The video quality estimation module 16 estimates a quality factor based on some or all of the data from the decoder module 14. The quality factor provides an estimation of a visual quality of the video content. The visual quality corresponds to an agreed-upon standard quality for a displayed video image.

In one embodiment, the quality factor suggests an amount of adjustment to improve the quality of the video content at or close to a predetermined level. In another embodiment, the quality factor indicates the amount of compression the video content has undergone.

A database control module 18 receives the quality factor and selects one of a plurality of settings from a database 20. The database settings are predetermined and correspond to settings for a video post-processor module 22.

The video post-processor module 22 receives the database settings from the database 20 and adjusts post-processing settings based on the database settings. In one embodiment, adjustments of post-processing settings include turning on or off settings of the video post-processor module 22. In another embodiment, adjustments of post-processing settings include increasing or decreasing settings of the video post-processor module 22 to predetermined levels.

In one embodiment, the predetermined levels are determined through experimentation by computing quality factors for content coded at different bitrates. For content coded at different bitrates, the settings for each of the modules of the video postprocessor module 22 are adjusted to yield a visually pleasing result on a display 26. The display 26 receives and displays the video content based on the post-processor settings. Further adjustments and display analysis (for visually pleasing results) are repeated for a variety of content and visual evaluations to yield the predetermined levels for the video post-processor module 22.

In one embodiment, adjustments of post-processing settings include increasing or decreasing settings of the post-processor module 22 by predetermined amounts. The database control module 18 adjusts the post-processor settings to either remove or reduce artifacts that affect the video content.

Examples of artifacts are blockiness, ringing, false edges, blurring and loss of colorfulness. Blockyness is distortion that is due to aggressive quantization of the transform data. Ringing is distortion that is present at high contrast edges close to smooth areas. False edges are distortion that is due to motion compensation of a blocking artifact. Blurring is distortion that is due to loss of high frequency components of the signal represented by the underlying coded block unit. Loss of colorfulness is due to aggressive quantization and reduction of dynamic range of the chroma components relative to the luma. Therefore, examples of post-processor settings are settings for blockyness, ringing, mosquito noise, false edges, blurring and loss of colorfulness.

In one embodiment, the content transmitting system 11 selectively includes the metadata of the video content on a stream session basis for sessions that have a consistent bitrate throughout an entire video stream. For this embodiment, the post-processor module 22 adapts settings on a stream session basis based on the quality factor.

In another embodiment, the content transmitting system 11 selectively includes the metadata of the video content on a group of pictures (GOP) basis. The group of pictures basis is used when streaming sites change the bitrate and spatial resolution according to the bandwidth available at any given time. For this embodiment, the post-processor module 22 adapts settings on a group of pictures basis based on the quality factor.

In another embodiment, the content transmitting system 11 includes the metadata on a frame by frame basis. For this embodiment, the post-processor module 22 adapts settings on a frame by frame basis based on the quality factor.

The video quality estimation module 16 determines a quality factor for each session, group of pictures or frame based on the metadata information and/or the video content.

In one embodiment, the video quality estimation module 16 estimates the quality factor (QF) as follows:

$$QF = \frac{\text{Bitrate } (kbps) \times \text{codec\_weight}}{\text{Spatial Resolution} \times \text{Temporal Resolution } (fps)}.$$

Spatial Resolution corresponds to frame width multiplied by frame height in, for example, pixels. Codec weight corresponds to a weight factor that captures quality improvement using one codec relative to another. Codec weight is expressed relative to a preselected standard that has a codec weight of 1, so that quality factor is greater than 0.

In one embodiment, different codec weights are assigned to different coding methods based on the bitrate. For example, a first coding method has a codec weight of 1 for bitrates less than or greater than 1 Mbps. A second coding method has a codec weight of 1.33 for bitrates less than or greater than 1 Mbps. A third coding method has a codec weight of 1.74 for bitrates less than 1 Mbps and a codec weight of 2.75 for bitrates greater than 1 Mbps. A fourth coding method has a codec weight of 2 for bitrates less than 1 Mbps and a codec weight of 3.16 for bitrates greater than 1 Mbps. For each coding method, using the same content, the bitrate is different.

Figure 2:
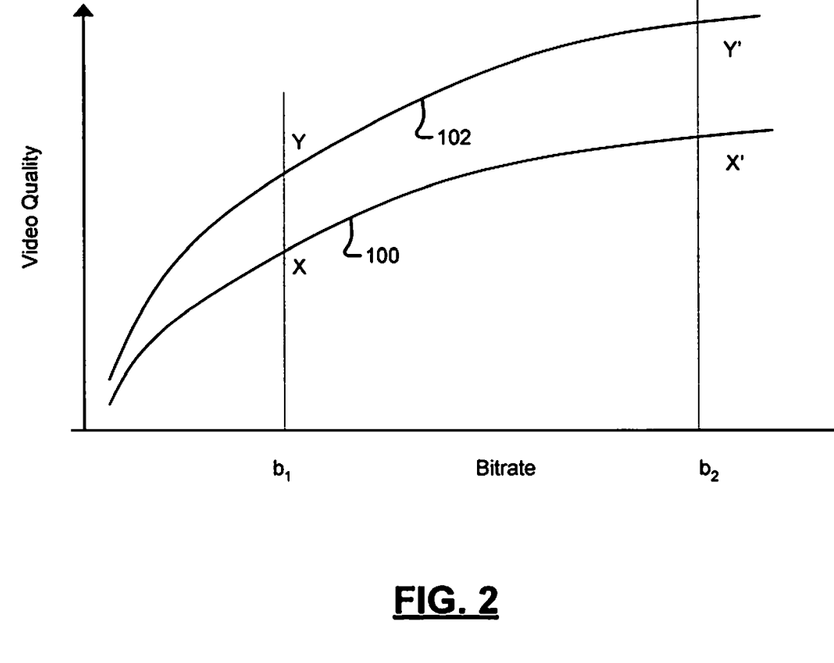
FIG. 2 is a graphical representation of video quality and bitrate for coding methods according to the present disclosure.

Referring now to FIG. 2, a graphical representation of the first coding method 100 and the fourth coding method 102 is illustrated. Codec weight for the second method versus (i.e. over) the first method at bitrate $b_1$ is Y/X and at bitrate $b_2$ is Y'/X'. Different codecs exhibit non-uniform behavior across a range of bitrates. In other words, performance gaps appear among the codecs at higher bit rates. However, at lower bitrates the codecs perform nearly the same.

For the quality factor, higher bits per pixel (i.e., bitrate/(spatial resolution×temporal resolution)) tends to lead to a higher quality factor. In one embodiment, a higher quality factor indicates that the video signal (e.g., coded video stream) is of higher quality and has less artifacts caused by signal compression than the video signal would with a lower quality factor. Codecs tend to provide a higher quality factor when allowed to represent the video content at higher bits per pixel. Codec weight indicates quality variation across codecs. Further, for the same bitrate, a first coding method provides higher quality than a less efficient second coding method.

In one embodiment, several parameters in an encoder module (not shown) of the content transmitting system 11 are set. The parameters are set when the content transmitting system 11 encodes a video content at a specific bitrate and spatial/temporal resolution using a particular codec. The content transmitting system 11 transmits to the system 10 the video signal. The video signal includes an indication of the parameters along with the video content. The parameters are different than the metadata and provide direct indications of content quality.

Examples of the parameters are average quantization parameter (QP) value, bitrate/frame rate (bits/frame), number of inter blocks, number of skipped blocks, frame rate, number of inter blocks having a first size, such as 8×8, 16×8 and 8×16, number of inter blocks having a second size, such as 4×4, 8×4 and 4×8, and average motion vector length.

For a sequence that has N of the parameters, the video quality estimation module 16 forms a weighted sum to arrive at a perceptual video quality metric (PVQM) (i.e., perceptual quality factor) of a video sequence. The weighted sum corresponds to:

$$PVQM = \beta_0 + \sum_{i=1}^{N} \beta_i \, x_i,$$

β corresponds to constants computed from a training set, and x corresponds to the particular parameter. A range of the perceptual quality factor is partitionable into smaller ranges. Each of the smaller ranges categorizes a subset of the video sequence, such as a group of pictures or frames. In one embodiment, the video quality estimation module 16 receives the N parameters as inputs from the decoder module 14.

The video quality estimation module 16 quantizes the perceptual quality factor into bins (not shown). The database control module 18 then accesses the video post-processor settings needed for quality factors that correspond to the bins via an index (not shown). For example, the video quality estimation module 16 quantizes the perceptual quality factor into 4-2 bits bins and implements a 2 bit index for accessing of the video post-processor settings needed for each quality factor.

Figure 3:
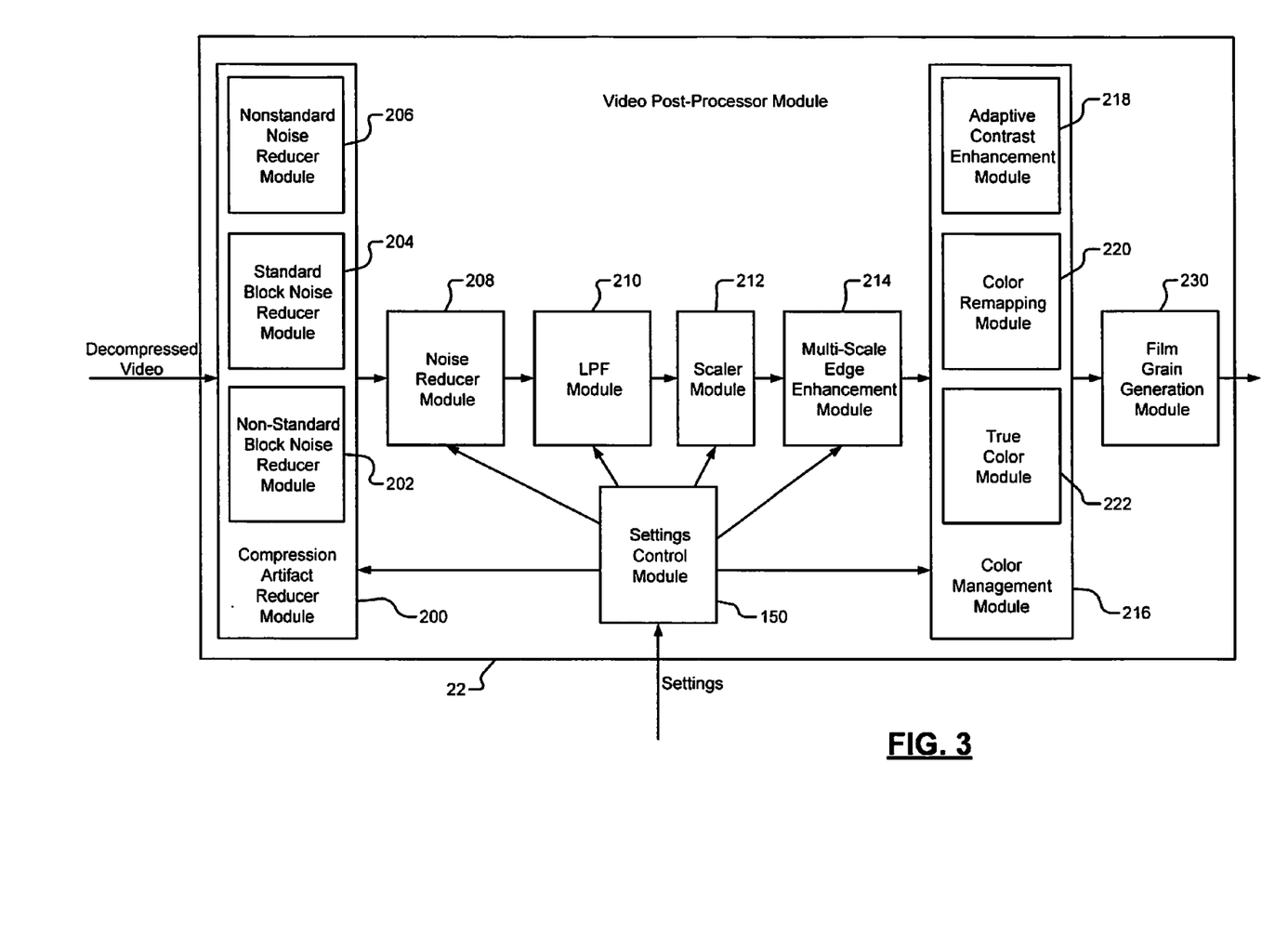
FIG. 3 is a block diagram that illustrates a video post-processor module according to the present disclosure.

Referring now to FIG. 3, the post-processor module 22 is illustrated in greater detail. The post-processor module 22 receives the decompressed video signal from the decoder module 14 and post-processor settings from the database 20. The post-processor module 22 has a plurality of modules and sub-modules that are adjusted based on the settings.

For example, each setting adjusts one or more of the modules and/or sub-modules in order to change the quality of the compressed video signal with respect to a displayed image based on the compressed video signal. In one embodiment, each of the modules and sub-modules automatically adjusts its own setting in response to database settings. In another embodiment, a setting control module 150 controls settings of the modules and/or sub-modules based on the database settings. In one embodiment, the settings control module 150 automatically controls the settings of the modules and/or sub-modules based on the database settings.

Examples of modules and sub-modules are a compression artifact reducer module 200, a nonstandard block noise reducer module 206 that may be a mosquito and ringing noise reducer module and a standard block noise reducer module 204.

For example, when the quality factor indicates that the video signal has excessive blockyness, the database control module 18 selects the blockyness setting in the database 20. In one embodiment, the blockyness setting simply turns the standard block noise reducer module 204 on/off in the post-processor module 22. In another embodiment, the blockyness setting sets the standard block noise reducer module 204 to a predetermined level. In another embodiment, the blockyness setting simply increases or decreases a value within the standard block noise reducer module 204 between a minimum and a maximum range of the standard block noise reducer module 204.

Further examples of modules and sub-modules are a non-standard block noise reducer module 206, a noise reducer module 208, a low pass filter (LPF) module 210 and a scaler module 212. Further examples of modules and sub-modules are an edge multi-scale edge enhancement module 214, a color management module 216, an adaptive contrast enhancement module 218, a color remapping module 220, a true color module 222, and a film grain generation module 230.

The compression artifact reducer module 200 reduces artifacts from the incoming decompressed video signal. The compression artifact reducer module 200 has various artifact reducing sub-modules. The sub-modules are the mosquito and ringing noise reducer module 202, the standard block noise reducer module 204 and the nonstandard block noise reducer module 206. Each of the sub-modules handles a different type of artifact, such as mosquito and ringing noise and standard and non-standard block noise, in the decompressed video signal. The nonstandard block noise reducer module 202 handles block noise reduction when the decompressed video signal is scaled.

The spatio-temporal noise reducer module 208 reduces noise, such as Gaussian noise, in the decompressed video signal. The LPF module 210, receives and adaptively filters the decompressed video signal. The scaler module 212 upscales the decompressed video signal to a predetermined output resolution. The multi-scale edge enhancement module 214 filters the decompressed video signal to improve apparent sharpness of the signal, thus enhancing edge contrast of the signal. For example, the edge enhancement module 214 enhances fine details and provides luminance/chrominance transition improvements in the decompressed video signal.

The color management module 216 manages the appearance of colors in the decompressed video signal. The color management module 216 has various sub-modules to manage the appearance of color. One embodiment of the color management module 216 has the adaptive contrast enhancement module 218, the color remapping module 220 and the true color module 222.

The adaptive contrast enhancement module 218 adjusts contrast within the decompressed video signal. The color remapping module 220 provides hue/saturation adjustments and has flesh-tone detection and correction. The true color module 222 reduces banding artifacts. Banding artifacts occur when X bit content is displayed on a high contrast display that can resolve more shades of the luminance or color signal compared to the input signal. The true color module 222 also reduces low contrast blocking artifacts. The film grain generation module 230 adds film grain-like noise to the compressed video signal in cases when there is loss of detail due to excessive compression.

In one embodiment, the settings in the database 20 are predetermined through testing various settings for one or more of the modules of the post-processor module 22. In other words, for particular quality factors, a technician views the display 26 and adjusts settings of the post-processor module 22 to improve images on the display. The settings are then each assigned to one of a plurality of quality factors. The quality factors correspond to levels of content quality, which are characterized in one embodiment as low, moderate and high.

For example, a low quality factor, e.g., less than 0.15, indicates low bitrate content, e.g., content having a bitrate less than 500 kbps and/or spatial resolutions of 384×288 or lower.

In one embodiment, the post-processor module settings are aggressive for the low quality factor. Aggressive means that the settings are set from off to on or that the settings are set to a high range. The aggressive settings are specific to one or more of the post-processor modules, such as the compression artifact reducer module 200 and the edge enhancement module 214. The low bitrate content tends to have extensive blockyness, ringing artifacts and washed out colors. In one embodiment, settings for particular modules are selected that have the most impact on the present artifacts. For example, settings for the compression artifact reducer module 200 and the multi-scale edge enhancement module 214 are selected because they have the most impact on extensive blockyness, ringing artifacts and washed out colors.

Further, a moderate quality factor, e.g., in the range 0.15 to 0.5, indicates moderate bitrate content, e.g., content having a bitrate 500 kbps to around 1 Mbps and spatial resolutions are 480×360 (360p) and higher.

In one embodiment, the post-processor module settings are aggressive for the moderate quality factor. The aggressive settings are specific to one or more of the post-processor modules, such as the compression artifact reducer module 200 and the edge enhancement module 214. The moderate bitrate content tends to have some blockyness and ringing artifacts. The compression artifact reducer module 200 and the edge enhancement module 214 are selected in one embodiment because they have the most impact on blockyness and ringing artifacts.

Still further, a high quality factor, e.g., greater than 0.5, indicates a high bitrate content, e.g., content having greater than 1 Mbps and spatial resolutions are 480×360 (360p) and higher including 1280×720 (720p).

In one embodiment, the post-processor module settings are not aggressive for the high quality factor. These settings are specific to one or more of the post-processor modules, such as the compression artifact reducer module 200 and the edge enhancement module 214. The high bitrate content tends to have minor blockyness and ringing artifacts. The compression artifact reducer module 200 and the edge enhancement module 214 are selected in one embodiment because they have the most impact on blockyness and ringing artifacts.

In another embodiment, quality factors are characterized as simply high or low. For high quality factors, the mild settings for the post-processor module 22 are used. For moderate to low quality factors, aggressive settings are used.

One example of aggressive settings are setting the compression artifact reducer module 200 to high, setting the edge enhancement module 214 to high, setting the spatio-temporal noise reducer module 208 to off, setting the scaler module 212 to on, setting the color remapping module 220 to moderate (e.g., between high and low settings) depending on the video content, setting the true color module 222 to on/high, and setting the film grain generation module 230 to off or on depending on the video content.

One example of mild settings are setting the compression artifact reducer module 200 to mild (e.g., between high and low settings but closer to the low settings than the high settings), setting the multi-scale edge enhancement module 214 to mild, setting the color remapping module 220 the same as for the aggressive settings, setting the spatio-temporal noise reducer module 208 to off, setting the scaler module 212 to on, setting the color remapping module 220 the same as for the aggressive settings, setting the true color module 222 to on/high, setting the film grain generation module 230 to off.

Figure 4:
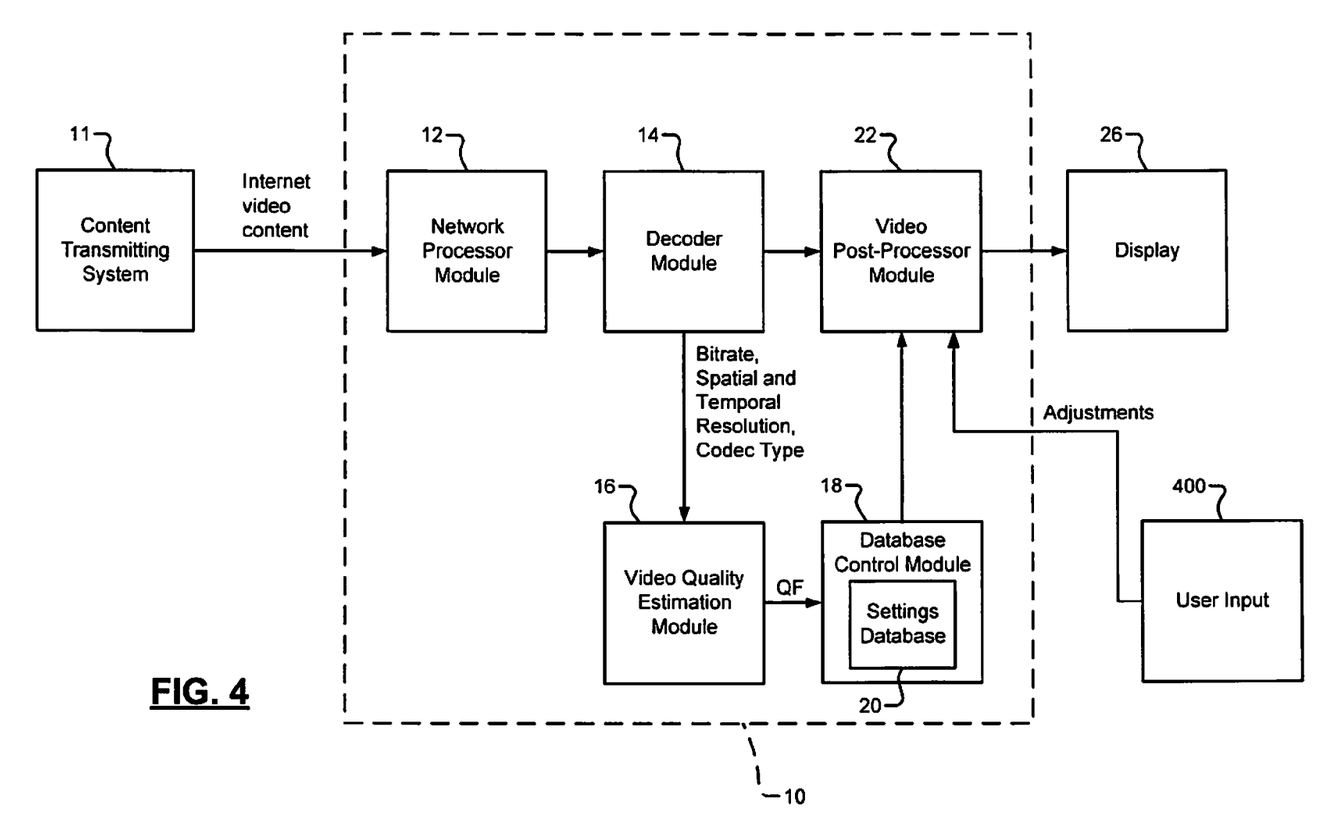
FIG. 4 is a block diagram that illustrates a video processing system according to a second embodiment of the present disclosure.

Referring now to FIG. 4, an alternative embodiment of the system 10 is illustrated. In this embodiment, a user input 400 is provided whereby a user provides settings to the post-processor module 22. The user reviews the display 26 and supplements or changes the settings of the post-processor module 22 from the database 20. The user or a group of users adjusts settings via the database control module 18 to visually pleasing result for the display of the video content.

Alternatively, the settings for the post-processor module 22 do not set all of the modules. Instead, the user input provides settings for the post-processor module 22 for the modules that were not set by the database settings. In one embodiment, user input 400 sets modules that do not have corresponding metadata available in the video content signal, for example, the non-standard block noise reducer module 202 and the film grain generation module 230.

Figure 5A:
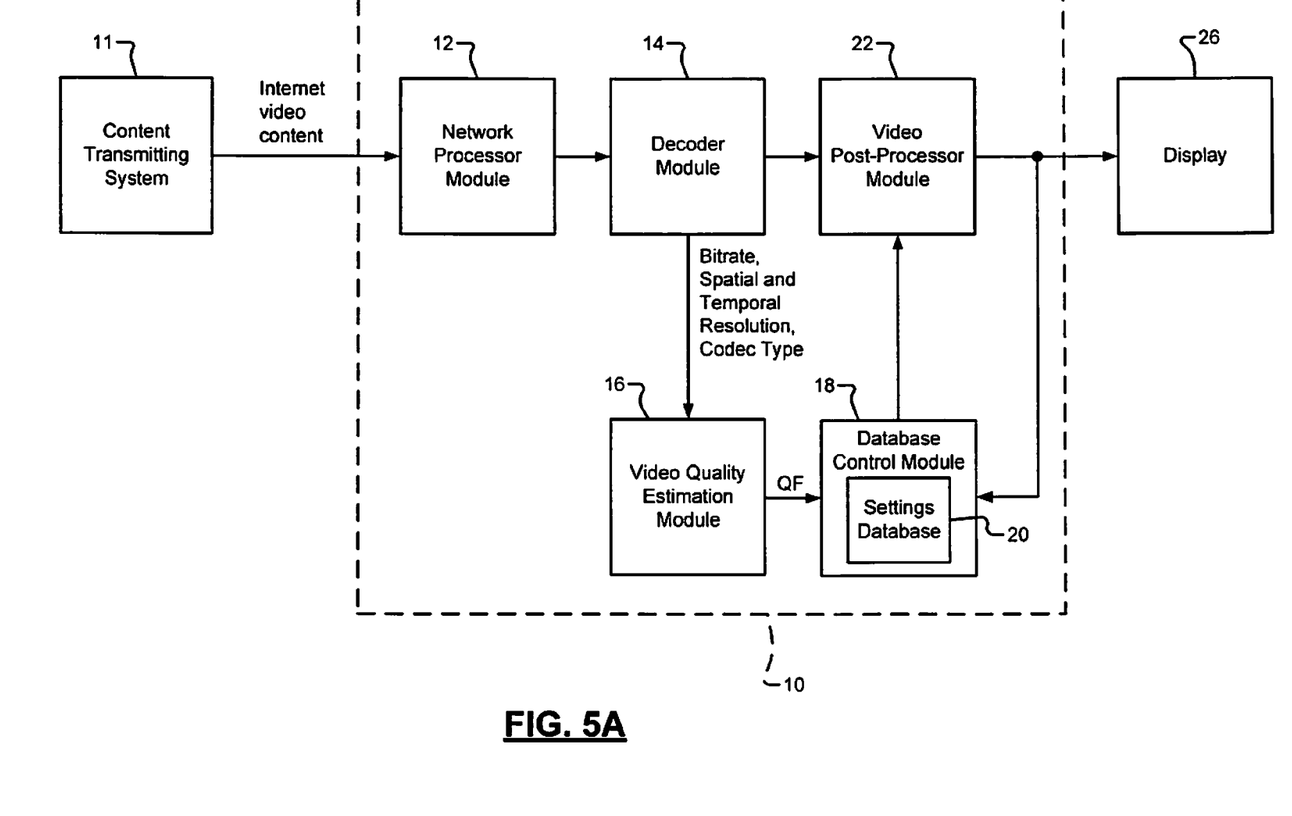
FIG. 5A is a block diagram that illustrates a video processing system according to a third embodiment of the present disclosure.

Referring now to FIG. 5A, an alternative embodiment of the system 10 is illustrated. In this embodiment, the database control module 18 receives outputs of the post-processor module 22 after the settings have been adjusted based on the quality factor.

In other words, FIG. 5A illustrates a closed loop scheme where a quality factor is used to initially select the settings of the post-processor module 22. The input and output signals of the post-processor module 22 are monitored to estimate residual artifacts in the output video after the initial settings are implemented. Examples of residual artifacts are blockyness and blurriness. Setting selection is further refined prior to processing of a subsequent sequence, group of pictures or frame based on adjustments to the settings. The adjustments to the settings are made in response to the residual artifacts in the output video.

The system of FIG. 5A therefore provides an automated adjustment mechanism for the settings of the post-processor module 22. For example, the settings may be adjusted from mild to aggressive based on the amount of residual artifacts in outputs of the video post-processor module 22.

Figure 5B:
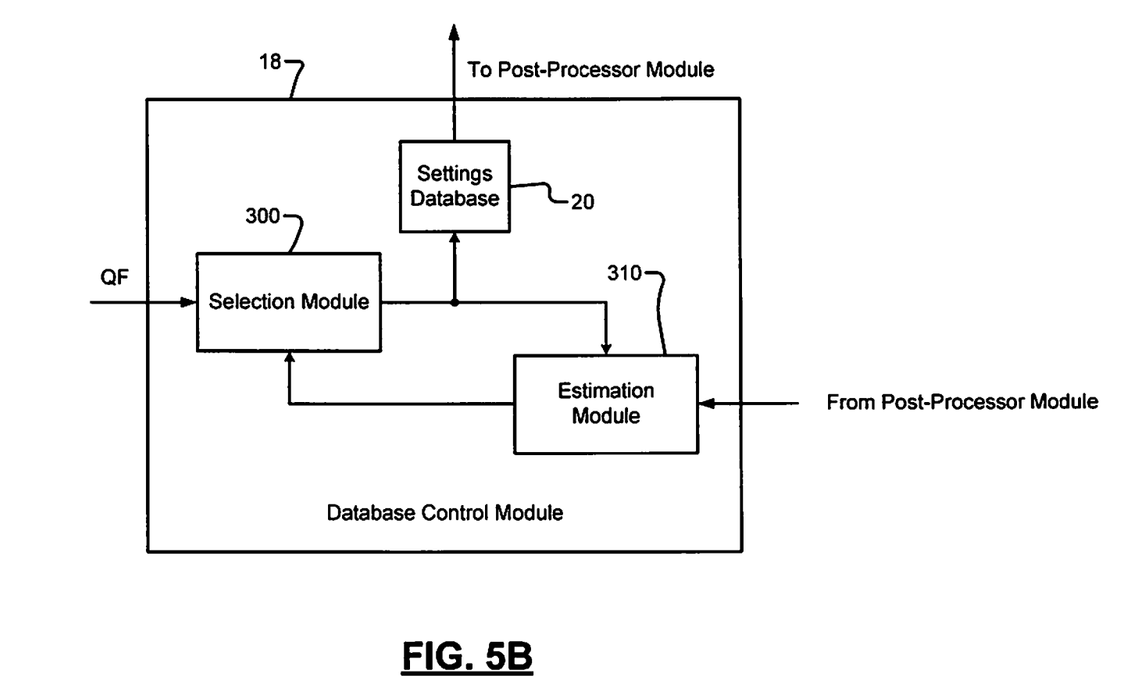
FIG. 5B is a block diagram that illustrates a database control module according to the third embodiment of the present disclosure.

Referring now to FIG. 5B, the database control module 18 is illustrated. The database control module 18 has a selection module 300 that receives quality factors from the video quality estimation module 16. The selection module 300 selects settings from the database 20. An estimation module 310 estimates residual artifacts in output signals from the video post-processor module 22. The selection module 300 receives estimates from the estimation module 310 and adjusts selection of settings based on both the estimates and the quality factors. The selection module 300 then selects settings from the database 20 based on the adjusted selection of settings.

Figure 6:
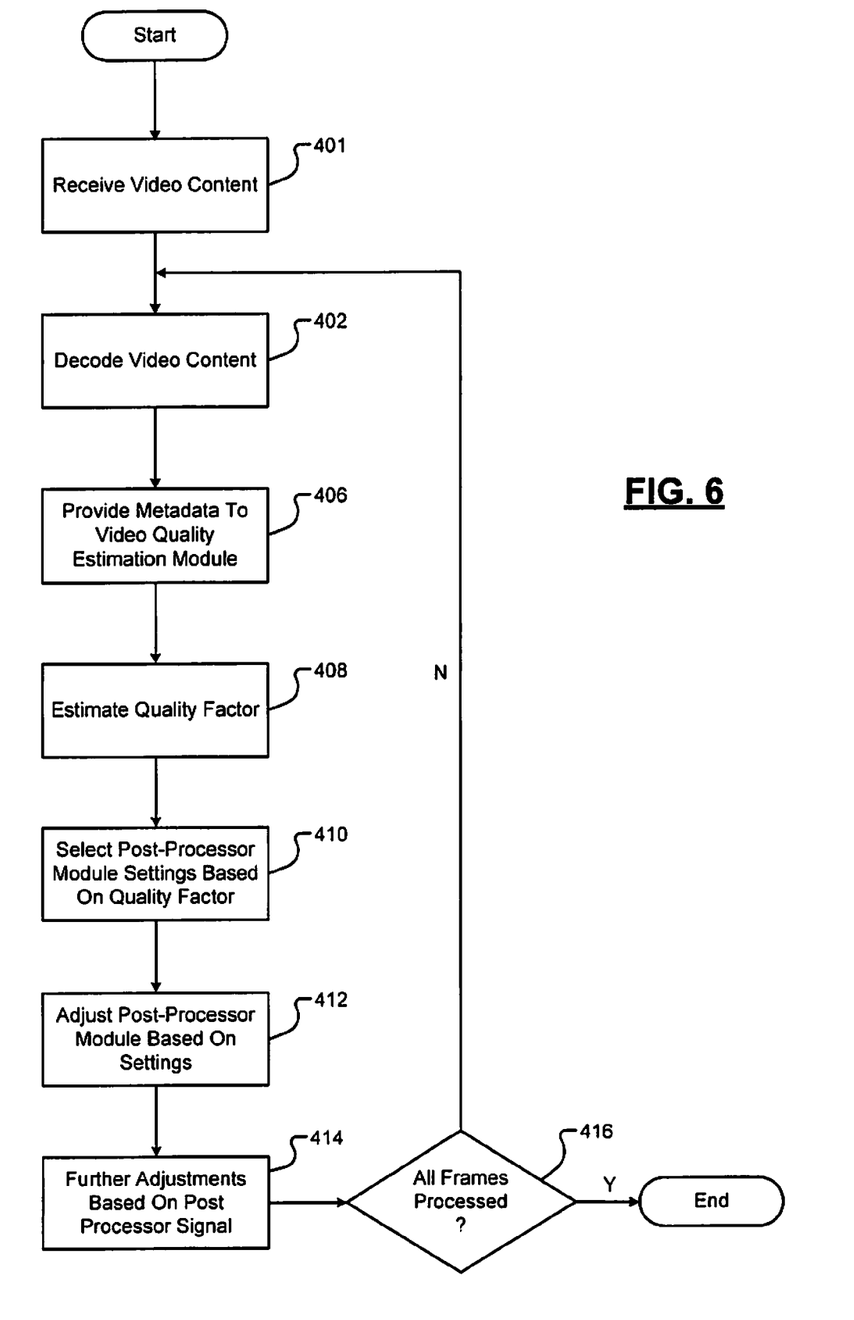
FIG. 6 is a block diagram that illustrates a method for operating a video processing system according to the present disclosure.

Referring now to FIG. 6, an example of operations used for adjusting settings of the post-processor module 22 is illustrated. At 401, the network processor module 12 receives video content along with data that describes transmission features for the video content, such as metadata. At 402, the decoder module 14 decodes the video content. At 406, the decoder module 14 provides the metadata to the video quality estimation module 16. At 408, the video quality estimation module 16 estimates a quality factor based on the metadata.

At 410, the database control module 18 selects settings for the post-processor module 22 based on the quality factor. At 412, the post-processor module 22 adjusts settings based on the quality factor. At 414, further adjustments may be made based on outputs from the post-processor module 22. User inputs and/or the database control module 18 may provide further adjustments. At 416, if all frames of the video content are not processed, control returns to 402.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A video processing system, comprising:
a network processing module configured to receive, from a content transmitting system external to the video processing system, video content;
a decoder module configured to i) decode the video content received from the content transmitting system, and ii) separately provide each of the decoded video content and data describing transmission features of the video content;
a video quality estimation module configured to estimate a quality factor based on the data describing the transmission features of the video content, wherein the quality factor corresponds to an estimation of a visual quality of the video content;
a database control module configured to select, based on the quality factor, a first predetermined setting of a plurality of predetermined settings for video post-processing, wherein the first predetermined setting includes respective adjustments to a plurality of different video processing parameters; and
a video post-processing module configured to i) receive the decoded video content separately provided from the decoder module, and ii) process the decoded video content based on the selected first predetermined setting.

2. The video processing system of claim 1, wherein the data describing the transmission features of the video content includes a bitrate, a spatial resolution, a temporal resolution, and/or a codec type.

3. The video processing system of claim 1, wherein the visual quality of the video content corresponds to a predetermined quality for a displayed video image.

4. The video processing system of claim 1, wherein the quality factor indicates an amount of adjustment to improve the visual quality of the video connect to a predetermined level.

5. The video processing system of claim 1, wherein the quality factor corresponds to an amount of compression applied to the video content received from the content transmitting system.

6. The video processing system of claim 1, wherein the video post-processing module is configured to adjust, based on the selected first predetermined setting, post-processing settings to process the decoded video content.

7. The video processing system of claim 6, wherein adjusting the post-processing settings includes selectively increasing or decreasing the post-processing settings.

8. The video processing system of claim 6, wherein the post-processing settings correspond to settings for blockyness, ringing, mosquito noise, false edges, blurring, and/or loss of colorfulness.

9. The video processing system of claim 1, wherein the data describing the transmission features of the video content is received from the content transmitting system.

10. The video processing system of claim 1, wherein the data describing the transmission features of the video content is received from the content transmitting system on a stream session basis, a group of pictures basis, and/or a frame by frame basis.

11. A video processing system, comprising:
a network processing module configured to receive, from a content transmitting system external to the video processing system, video content;
a decoder module configured to i) decode the video content received from the content transmitting system, and ii) separately provide each of the decoded video content and data describing transmission features of the video content;
a video quality estimation module configured to estimate a quality factor based on the data describing the transmission features of the video content, wherein the quality factor corresponds to an estimation of a visual quality of the video content;
a database control module configured to select, based on the quality factor, a first predetermined setting of a plurality of predetermined settings for video post-processing; and
a video post-processing module configured to i) receive the decoded video content separately provided from the decoder module, and ii) process the decoded video content based on the selected first predetermined setting,
wherein the video quality estimation module is configured to estimate the quality factor further based on a codec weight of a codec type of the video content, wherein the codec weight corresponds to an assigned weight of the codec type as compared to other codec types.

12. A method for operating a video processing system, the comprising:
receiving, from a content transmitting system external to the video processing system, video content;
decoding the video content received from the content transmitting system;
separately providing each of the decoded video content and data describing transmission features of the video content;
estimating a quality factor based on the data describing the transmission features of the video content, wherein the quality factor corresponds to an estimation of a visual quality of the video content;
selecting, based on the quality factor, a first predetermined setting of a plurality of predetermined settings for video post-processing, wherein the first predetermined setting includes respective adjustments to a plurality of different video processing parameters;
receiving, at a video post-processing module, the separately provided decoded video content; and
processing, using the video post-processing module, the decoded video content based on the selected first predetermined setting.

13. The method of claim 12, wherein the data describing the transmission features of the video content includes a bitrate, a spatial resolution, a temporal resolution, and/or a codec type.

14. The method of claim 12, wherein the visual quality of the video content corresponds to a predetermined quality for a displayed video image.

15. The method of claim 12, wherein the quality factor indicates an amount of adjustment to improve the visual quality of the video connect to a predetermined level.

16. The method of claim 12, wherein the quality factor corresponds to an amount of compression applied to the video content received from the content transmitting system.

17. The method of claim 12, wherein the selected first predetermined setting corresponds to settings for blockyness, ringing, mosquito noise, false edges, blurring, and/or loss of colorfulness.

18. The method of claim 12, wherein the data describing the transmission features of the video content is received from the content transmitting system.

19. The method of claim 12, wherein the data describing the transmission features of the video content is received from the content transmitting system on a stream session basis, a group of pictures basis, and/or a frame by frame basis.

20. A method of operating a video processing system, the method comprising:

receiving, from a content transmitting system external to the video processing system, video content;

decoding the video content received from the content transmitting system;

separately providing each of the decoded video content and data describing transmission features of the video content;

estimating a quality factor based on the data describing the transmission features of the video content, wherein the quality factor corresponds to an estimation of a visual quality of the video content;

selecting, based on the quality factor, a first predetermined setting of a plurality of predetermined settings for video post-processing;

receiving, at a video post-processing module, the separately provided decoded video content; and     processing, using the video post-processing module, the decoded video content based on the selected first predetermined setting,     wherein estimating the quality factor includes estimating the quality factor further based on a codec weight of a codec type of the video content, wherein the codec weight corresponds to an assigned weight of the codec type as compared to other codec types.

\* \* \* \* \*